Dec. 15, 1970  T. H. BULPITT ET AL  3,547,542
HIGH SCANNING SPEED SPECTROMETER
Filed March 1, 1968  4 Sheets-Sheet 1
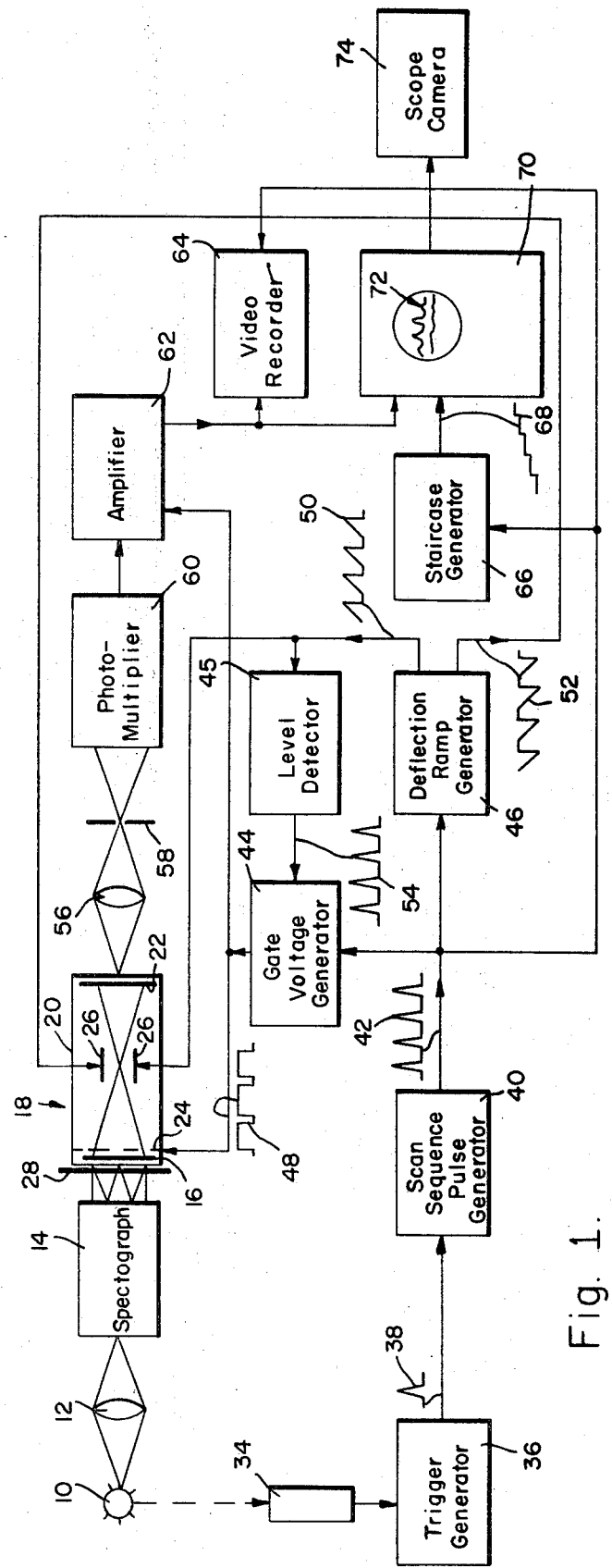
Fig. 1.
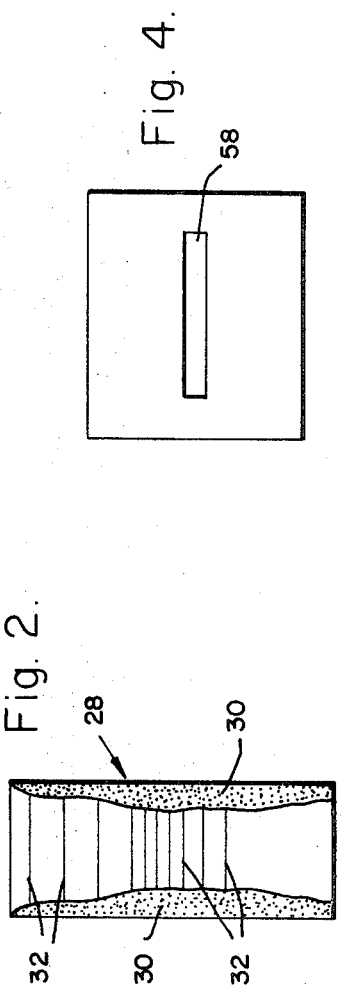
Fig. 4.
Fig. 2.
Thomas H. Bulpitt,
David G. Fladlien,
INVENTORS.
BY.
Jerry G. Dimardo
AGENT Thomas H. Bulpitt,
David G. Fladlien,
INVENTORS.
BY.

*Jerry A. Dinardo*

AGENT

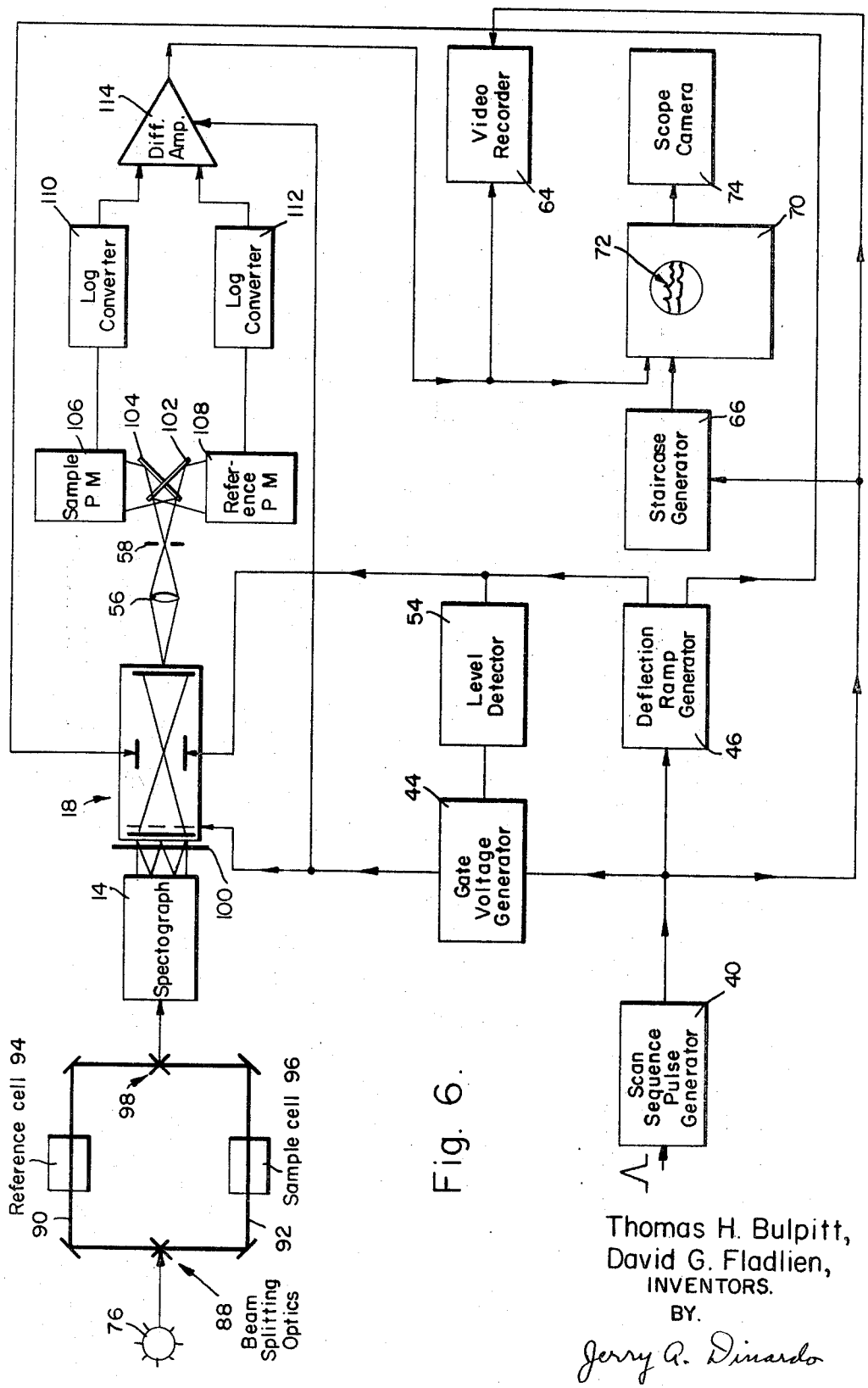

United States Patent Office

3,547,542
Patented Dec. 15, 1970

3,547,542
HIGH SCANNING SPEED SPECTROMETER
Thomas H. Bulpitt, Northridge, and David G. Fladlien, Los Angeles, Calif., assignors to TRW Inc., Redondo Beach, Calif., a corporation of Ohio
Filed Mar. 1, 1968, Ser. No. 709,630
Int. Cl. G01j 3/12, 3/42
U.S. Cl. 356—83                    16 Claims

ABSTRACT OF THE DISCLOSURE

The emission or transmission spectrum of a transient event under investigation is projected onto the photocathode of an electronic image converter tube. While the electronic shutter or gating grid of the tube is pulsed, the output image on the fluorescent screen thereof is deflected synchronously at high speed across an optical slit. As each component of the spectrum passes across the slit, a signal representing the light intensity of that spectral component is generated and recorded.

BACKGROUND OF THE INVENTION

Field of the invention

This invention relates to a method and apparatus for analyzing the spectral characteristics of transient optical events and, more particularly, for recording these characteristics with exceptionally high speed and definition.

Description of the prior art

In many transient events it is desirable to scan the spectral region of interest in a short time. Such scanning has the advantage of direct readout. Furthermore, the detector used in a scanning system may also serve to amplify the limited amount of light that is usually available and that cannot be recorded by conventional data recording means such as photographic film. Prior art scanning systems such as those employing rotating mirrors are incapable of achieving the rotational velocities that detectors are easily capable of resolving. Presently known electronic scanning systems based on television scan or image dissecting techniques, such as those disclosed in U.S. Pat. No. 2,871,465 to N. H. Nielsen or U.S. Pat. No. 3,235,798 to M. J. O. Strutt, are rather complicated in overall design or require rather expensive special purpose electronic tubes.

SUMMARY OF THE INVENTION

In accordance with the invention, spectral analyzing apparatus is provided that includes means, such as a spectrograph, for producing an optical image of the spectrum of a transient optical event. The optical image is electronoptically and periodically swept across a fixed optical slit, such as by means of an image converter tube. As the optical image is swept across the fixed slit, the spectral components of the optical image are detected, such as by means of a photomultiplier, to produce an electrical output having a time varying intensity characteristic related to the wavelength varying intensity characteristic of the spectrum. Provision is also made for storing and for visually recording the electrical output.

BRIEF DESCRIPTION OF THE DRAWING

In the drawing:
FIG. 1 is a diagrammatic view of a spectroradiometer according to the invention;
FIG. 2 is a front view of a masking member for an image converter tube, with a light spectrum shown in relation thereto;
FIG. 4 is a front view of a light limiting slit;
FIG. 6 is a diagrammatic view of another form of absorption spectrophotometer according to the invention.

DESCRIPTION OF THE PREFERRED EMBODIMENTS

Figure 3:
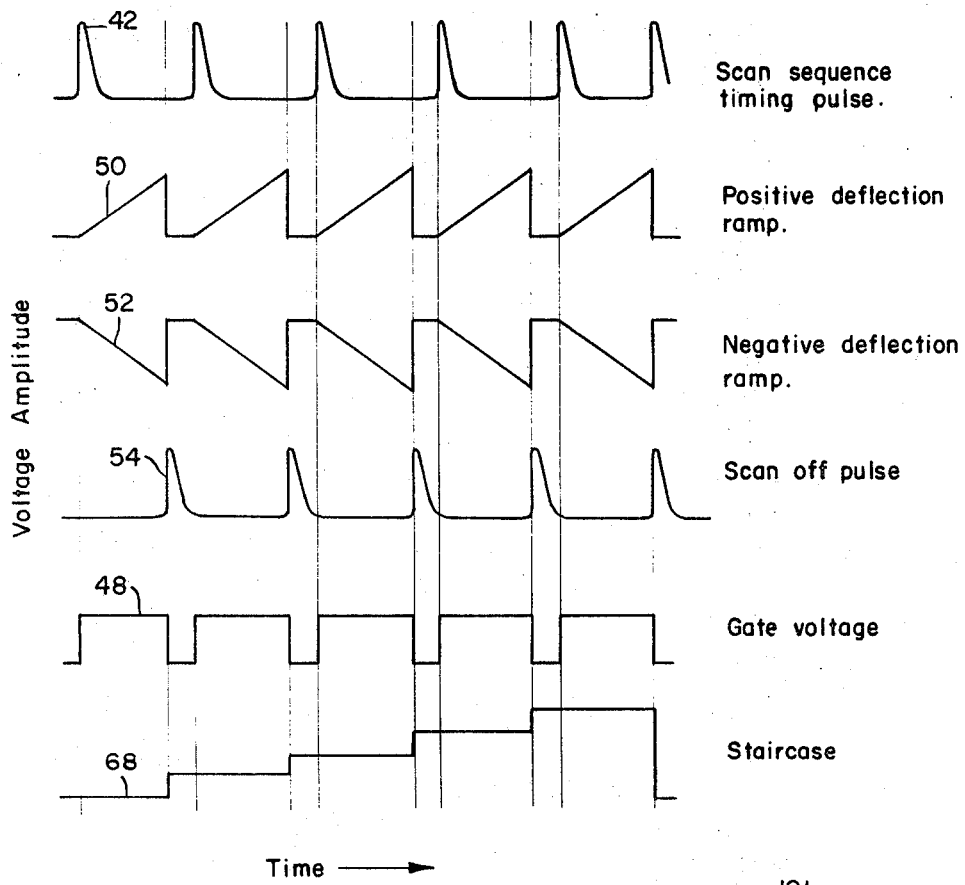
FIG. 3 is a graph of waveforms useful in explaining the operation of the apparatus of FIG. 1.

Referring to FIG. 1, the reference numeral 10 represents a transient luminous event, the emission spectrum of which is to be recorded. Light emission from the luminous event 10 is focussed by an objective lens 12 onto a spectrograph 14. The spectrograph 14 separates the spectral components of the radiation emitted by the luminous event 10 and projects the spectral image onto the photocathode 17 of an image converter tube 18.

The spectrograph 14 may be one of the kind disclosed in the textbook entitled Practical Spectroscopy, by Harrison, Lord and Loofbourow, published by Prentice-Hall, Inc., Englewood Cliffs, N.J., 1962, or in the article entitled "Astigmatism of Mirror Spectrometers," by M. Czerny and A. F. Turner, Zeitschrift für Physik, vol. 61 (1930), page 792.

The image converter tube 18 functions primarily as a high speed electron-optical spectrum scanner. Another function of the image converter tube 18 is to provide light amplification for the low levels of illumination frequently encountered from luminous events.

The image converter tube 18 comprises essentially a cylindrical vacuated envelope 20 containing, at one end the photocathode 16, which is photoemissive, a fluorescent screen 22 at the other end, a gating grid 24 adjacent to the photocathode 16, and a pair of deflection plates 26. Certain other parts and components essential to the operation of the image converter tube 18 are omitted for simplicity of description, since these are well known. For example, the image converter tube 18 ordinarily contains additional electrodes such as focussing and accelerating electrodes, and also requires a high voltage supply. It will suffice to say that the image converter tube 18 may be one of the kind manufactured by RCA and bearing the type number 4449A.

A masking member 28 may be provided in front of the photocathode end of the image converter 18 to compensate for the non-uniformity in photosensitivity and for the non-uniformity of spectral response over the surface area of the photocathode 16. Instances where the central regions of the photocathode 16 are more sensitive than the peripheral regions, the masking member 28 may be provided with light reflective and/or absorptive coatings 30, as shown in FIG. 2. The coatings 30 are tapered in width, the central portions being wider and the width tapering off in regions away from the center. In FIG. 2, the light spectrum 32 is identified as consisting of spaced lines.

In the operation of the apparatus of FIG. 1, it is necessary to amplify, or reproduce on the fluorescent screen 22 the light spectrum appearing on the photocathode 16. In addition, it is necessary to scan or sweep the light spectrum across an optical detector. To accomplish the foregoing, gating pulses are applied to the gating grid 24 in synchronism with deflection voltages applied to the deflection plates 26.

In the embodiment shown, the image converter tube 18 is triggered on by the radiation emitted by the luminous event 10. To this end, an energy detector 34, such as a phototube or silicon diode receives light from the luminous event 10 and generates an electrical signal that is fed to a trigger generator 36. The trigger generator 36 includes a threshold or level detector that permits a trigger pulse 38 to be generated only when the signal from the energy detector 34 exceeds a predetermined level, so as to prevent triggering by spurious or noise signals. The trigger generator 36 may be one of the kind disclosed in U.S. Pat. No. 3,151,268 issued to G. L. Clark et al. However, trigger generators are well known, and other types may be used. Similarly, level detectors are well known and therefore require no further explanation.

The trigger pulse 38 is fed to a scan sequence pulse generator 40 that generates a train of timing voltage pulses 42. The timing pulses 42 may have a duration of 1 microsecond and repetition rate of 100,000 pulses per second, for example. Pulse generators capable of producing the timing pulses 42 are well known and need no further description.

The timing pulses 42 are fed to a gate voltage generator 44 and to a deflection ramp generator 46. The gate voltage generator 44 generates a series of rectangular gating voltage pulses 48 that are fed to the gating grid 24 of the camera tube 18 to sequentially shutter the image converter 18. The gating pulses may have an amplitude of approximately 300 volts, an on time duration of 10 microseconds, and an off time of 3 microseconds, for example. The deflection ramp generator 46 generates a series of positive and negative ramp voltages 50 and 52 respectively which are fed to the deflection plates 26 for balanced deflection. Single ended deflection with one ramp may be used in some instances. While the gating pulses 48 are applied, the ramp voltages 50 and 52 cause the amplified image of the spectrum 32 to sweep across the flluorescent screen 22. In the example shown the spectrum 32 will be swept vertically downwards.

The positive output or voltage 50 of the deflection ramp generator 46 is fed to a level detector 53 which also produces a train of voltage pulses 54, similar to the trigger pulses 42, which are fed to the gate voltage generator to sequentially turn off the gating pulses 48. In other words, the gating pulses 48 are initiated by the trigger pulses 42, and are terminated by the voltage pulses 54 coincident with the termination of the ramp voltages 50 and 52. The level detector 53 may be one of the kind well known in the art which will generate a positive output when the positive ramp voltage 52 reaches a certain level. For example the positive ramp voltage 50 may be fed to the anode of a diode that is biased off by a reference voltage relative to the cathode. When the level of the ramp exceeds the bias voltage, the diode will conduct and cause a positive voltage output to be developed across a cathode load resistor, which then is shaped to produce the output voltage pulses 54.

The graph of waveforms in FIG. 3 shows the temporal relationship between the timing pulses 42, the ramp voltages 50 and 52, the voltage pulses 54 and the gate voltage 48. The amplitudes of the waveforms are in arbitrary units and are not necessarily indicative of relative amplitude.

The amplified image of the spectrum 32 appearing on the fluorescent screen 22 is projected by a lens system 56 and adjustable slit 58 onto a photomultiplier 60, with the slit 58 and photomultiplier 60 positioned so that in any given instant of time, only a small portion of the spectrum 32 is seen by the photomultiplier 60. For example, a slit 58 may be set to the same spectral width as that of the projected entrance slit of the spectrograph 14.

The slit 58 is arranged to have its width dimension in the same direction as the direction of scan of the image converter tube 18 and the direction of wavelength separation of the spectrum 32. Stated another way, in the example shown and referring to FIG. 4, the slit 58 is elongated in the horizontal direction. Thus, with the wavelengths of the spectrum 32 displaced vertically, vertical deflection of the spectral image will cause the spectrum 32 to scan across the slit 58 and image receiving end of the photomultiplier 60. As radiation from each wavelength band or portion of the spectrum 32 is received by the photomultiplier 60, an electrical signal representing the intensity of that radiation is generated by the photomultiplier 60.

The signal output of the photomultiplier 60 is fed to an amplifier 62 that is gated on, coincident with the gating of the image converter tube 18, by the gating pulses 48. The amplifier 62 thereby produces an output only during the periods of scan. The dwell period between scans allows all circuits to be prepared for the next scan.

By scanning the spectral image repeatedly, the apparatus is able to detect changes in the spectral content of the radiation source 10.

The output of the amplifier 62 may be fed to a video recorder 64 such as one employing magnetic tape. The video recorder 64 also records the timing pulses 42 so that the information recorded during each scan can be identified or marked. If desired, a visual display may be provided of each scan of the spectrum 32, with the signal information of each scan being displaced for comparative viewing. To this end, a staircase generator 66, energized by the timing pulses 42, produces a stepped or staircase voltage 68 that is fed to an oscilloscope 70, with the signal from the amplifier 62 superimposed on the staircase voltage 68. The signal information from successive scans of the spectrum 32 appears as a series of vertically displaced waveforms, three of which are shown generally at 72. The waveforms 72 may be photographically recorded on an oscilloscope camera 74.

Figure 5:
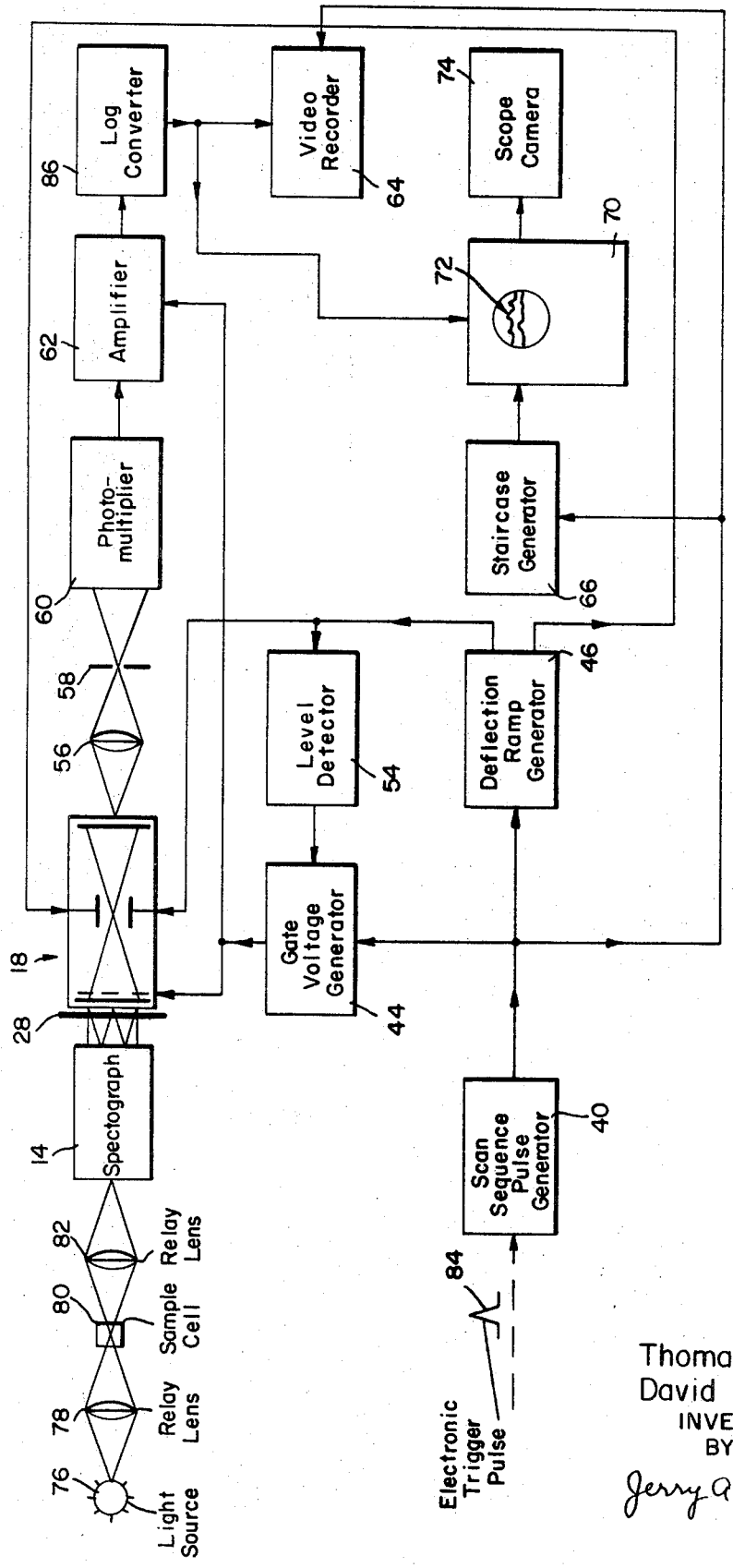
FIG. 5 is a diagrammatic view of one form of absorption spectrophotometer according to the invention.

FIG. 5 illustrates one form of the invention as applied to an absorption spectrophotometer. This form of the invention is useful for analyzing rapidly changing absorption spectra. Referring to the drawing, the radiation from a light source 76 is focused by an objective or relay lens 78 onto a sample cell 80.

The sample cell 80 may contain a liquid, gaseous, or solid material which absorbs one or more wavelengths of the light radiation from the light source 76 in varying amounts as a function of time. In the case of a gas, one may wish to look at the changing character of a rocket exhaust. In the case of a liquid, more commonly, two liquids may be rapidly mixed and repetitive scans of absportion will reveal how fast a reaction proceeds. More important, if an intermediate reaction occurs before the final product, it may be observed. This is generally called a transient species.

The radiation from the light source 76 is uniform in intensity and wavelength as to time. The light source 76 should have a high radiance and preferably exhibits a continum spectrum. The light source 76 may be flashed, but preferably it should have constant output during the sequence of scans. Such a light source 76 may be a high pressure xenon arc.

The scan sequence pulse generator 40 received a trigger pulse 84 to initate the recording process. The remainder of the apparatus is the same as that of FIG. 1, except that a log converter 86 is connected in the output of the amplifier 62 and the output of the log converter is fed to the video recorder 64 and the oscilloscope 70. The log converter 86 converts the linear response of the amplifier 62 to a logarithmic response, thereby converting the electrical analog of the transmission spectrum to the desired electrical analog of the absorption spectrum, which is linear with negative density.

An alternative form of absorption spectrophotometer is shown in FIG. 6. In this embodiment, radiation from the light source 76 is directed to a first beam splitter 88 which divides the radiation into two beams 90 and 92. One beam 90 passes through a reference cell 94, and the other beam 92 passes through a sample cell 96. The reference and sample cells 94 and 96 include containers which are optically identical. The reference cell 94 contains a material that is practically 100% light transmissive, whereas the sample cell 96 contains the material under investigation. Thus the transmitted beams 90 and 92 will differ spectrally only by the absorption occuring in the sample material.

The reference cell 94 may contain any liquid or gas which is transparent in the region of interest. Water may be used if the liquid sample is a water solution, or alcohol, if it is an alcohol solution, etc. If the sample is not a solution but a liquid, one may use a transparent liquid of known transmission having nearly the same refractive index. Air is sufficiently transparent as a reference material for gaseous samples.

Figure 7:
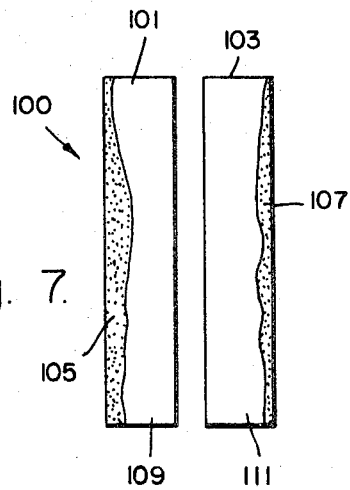
FIG. 7 is a front view of a masking member for compensating for unequal spectral transmission of two optical beams.

The transmitted beams 90 and 92 pass through an optical system 98 which brings the two beams together, side by side, so that they illuminate the spectrograph 14 in horizontally displaced fashion. The two spectra emanating from the spectrograph 14, one spectrum being the reference beam spectrum and the other being the sample beam spectrum, illuminate the image converter tube 18 in side by side relation. If desired, a mask 100 may be provided in front of the image converter tube 18 to compensate for the unequal spectral transmission in the aforementioned optics through which the two beams 90 and 92 pass. As shown in FIG. 7, the mask 100 may include two side by side strips 101 and 103, each having different irregularly shaped opaque areas 105 and 107 and transparent areas 109 and 111, respectively. Small differences in reflectivity or transmission of the optics over their areas will cause the two beams 90 and 92 to be slightly different. Such a mask 100 will correct for their differences and for variations in sensitivity of the photocathode of the image converter tube 18.

The two spectra appearing on the output of the image converter tube 18 pass through the lens 56 and slit 58 and impinge on a pair of mirrors 102 and 104. One mirror 102 directs the sample beam spectrum onto a first photomultiplier 106, whereas the other mirror directs the reference beam spectrum onto a second photomultiplier 108.

Figure 8:
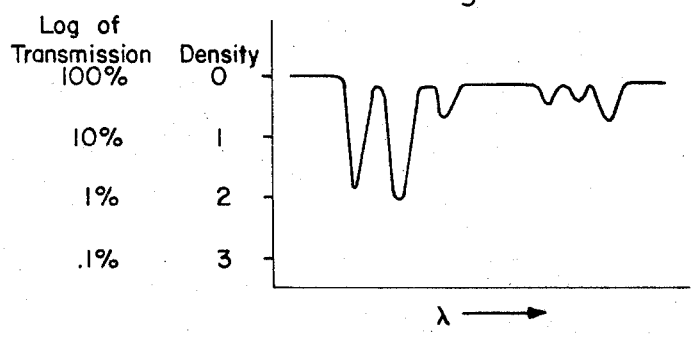
FIG. 8 is a graph useful in describing the operation of the embodiment of FIG. 6.

The output of the first photomultiplier 106 is fed to a first log converter 110 and the output of the second photomultiplier 108 is fed to a second log converter 112. The outputs of the log converters 110 and 112 are fed to a difference amplifier 114 which gives an output representing the logarithm of the ratio of the sample beam spectral intensity to the reference beam spectral intensity. Stated another way, the difference amplifier 114 gives any output representing the difference between the logarithm of the sample beam spectral intensity and the logarithm of the reference beam spectral intensity, which is equal to the logarithm of the sample spectral transmission. The logarithm of the sample spectral transmission is equal to the inverted spectral density, as illustrated in FIG. 8, which shows the density and logarithm of the sample transmission plotted as a function of wavelength $\lambda$.

The output of the difference amplifier is fed to the video recorder 64 and the oscilloscope 70. Otherwise, the apparatus is similar to that of FIG. 5.

The spectrum scanning techniques described above are not limited in speed by mechanical moving parts. The entire scanning process is electronic and optical. At the upper end scan speed is limited by the decay time of the image converter camera tube anode phosphor. Phosphors can be chosen to give 20 to 30 nanosecond decay time, thus the limiting speed is approximately 20 nanoseconds per element of spectral resolution. For 50 spectral resolution elements per scan, a scan can be completed in one microsecond or 500 to 1000 times faster than mechanical means. Slower scans up to those provided as accessories for spectrometers or spectrographs (in the neighborhood of one scan per second) can be obtained through the use of the proper gating and ramp circuitry.

Synchronization with the event is characteristic of this technique as it with other electronic scanning techniques. Mechanical scanners are not easily synchronized because of the inertia of their moving parts.

Neither image dissector nor image scanning techniques provide optical matching of entrance and exist slits prerequisite to optimum resolution for a given energy throughout. Some shaping or size changing of the scanned spot is possible with both, but they canot approach the precision with which the exit slit can be matched with the entrance slit in an optical system. The present invention does not employ spot scanning, but rather projects a deflected complete spectrum image of high resolution. By deflection of this complete spectrum image the spectrum is optical scanned with a slit of dimensions chosen by the operator.

The embodiments of the invention in which an exclusive property or privilege is claimed are defined as follows:

1. Spectral analyzing apparatus, comprising:
    means for producing an optical image of the spectrum of a transient optical event;
    electron-optical means for electron-optically, periodically sweeping said optical image across a fixed optical slit; and
    means for detecting the spectral components of said optical image as it is swept across said fixed slit.
2. The invention according to claim 1, wherein said sweeping means comprises an image converter tube.
3. The invention according to claim 1, wherein said detecting means comprises means for converting the spectral components of said optical image into an electrical output having a time varying intensity characteristic related to that of the spectrum.
4. The invention according to claim 3, and further including means for storing said electrical output.
5. The invention according to claim 3, and further including means for visually recording said electrical output.
6. Spectral analyzing apparatus, comprising:
    means for producing a radiant image of the spectrum of transient optical phenomena;
    said spectrum being distributed along a given direction;
    electron-optical means for electron-optically, periodically scanning said spectrum in said direction through an optical slit to produce temporal separation of the spectral components of said radiant image;
    means for converting said temporally separated spectral components into electrical signals representing the time varying energy distribution of said spectral components.
7. The invention according to claim 6, wherein said scanning means includes an image converter tube provided with a gating grid and deflection means;
    means for applying recurrent gating pulses to said gating grid; and
    means for applying a ramp voltage to said deflection means during the period of said gating pulses.
8. The invention according to claim 7, wherein said ramp voltage applying means includes a triggered ramp voltage generator.
9. Absorption spectrophotometric apparatus, comprising:
    means for irradiating a sample cell containing a material which absorbs some wavelengths and transmits other wavelengths of said irradiating means in varying amounts as functions of time;
    means for producing an optical image of the spectrum of said transmitted wavelengths;
    electron-optical means for electron-optically, periodically sweeping said optical image across a fixed optical slit; and
    means for detecting the spectral components of said optical image as it is swept across said fixed slit.
10. The invention according to claim 9, wherein said detecting means comprises means for converting the spectral components of said optical image into an electrical output having a time varying intensity characteristic related to that of said transmitted spectrum.

11. The invention according to claim 10, and further including log converter means for converting said electrical output that is related to the spectrum transmitted through said sample cell to an electrical output that is related to the absorption of said sample material.

12. Absorption spectrophotometric apparatus, comprising:
   means for irradiating a sample cell containing a material which absorbs some wavelengths and transmits other wavelengths of said irradiating means in varying amounts as functions of time and, for irradiating a reference cell which is substantially entirely transmissive of all wavelengths of said irradiating means;
   means for producing an optical image of the spectra transmitted through said sample and reference cells, respectively;
   electron-optical means for electron-optically, periodically sweeping said optical images across a fixed optical slit; and
   means for detecting the spectral components of said optical images as they are swept across said fixed slit.

13. The invention according to claim 12, wherein said detecting means comprises means for separately converting the spectral components of said optical images into a first pair of electrical outputs each having a time varying intensity characteristic related to that of the transmitted spectrum with which is it identified.

14. The invention according to claim 13, and further including a log converter associated with each of said transmitted spectra for converting said first pair of electrical outputs that are related to the spectra transmitted through said sample and reference cells, respectively, to a second pair of electrical outputs; and
   means for obtaining the difference between said second pair of electrical outputs to derive a signal that is representative of the absorption of said sample material.

15. A method of analyzing the spectral characteristics of a transient optical event, comprising:
   producing an optical image of the spectrum of said optical event;
   electron-optically periodically sweeping said optical image across a fixed optical slit; and
   detecting the spectral components of said optical image as it it swept across said fixed slit.

16. A method of analyzing the spectral characteristics of a transient optical event, comprising:
   producing a radiant image of the spectrum of said optical event with said spectrum being distributed along a given direction;
   electron-optically repetitively scanning said spectrum in said direction through an optical slit to produce temporal separation of the spectral components of said radiant image; and
   converting said temporally separated spectral components into electrical signals representing the time varying energy distribution of said spectral components.

References Cited
UNITED STATES PATENTS

| | | | |
|---|---|---|---|
| 2,324,270 | 7/1943 | Schlesman | 356—84 |
| 2,437,323 | 3/1948 | Heigl et al. | 356—83 |
| 2,444,560 | 7/1948 | Feldt et al. | 356—83 |
| 2,871,465 | 1/1959 | Nielsen | 356—83 |

RONALD L. WIBERT, Primary Examiner

V. P. McGRAW, Assistant Examiner

U.S. Cl. X.R.

250—226; 356—88, 99